Jan. 2, 1934.  H. SCHMITZ  1,942,218
MECHANISM FOR MANUFACTURING TENSIONLESS LOW TWIST WIRE ROPES
Filed Aug. 29, 1932

Hermann Schmitz
INVENTOR.
BY
ATTORNEY.

Patented Jan. 2, 1934

1,942,218

UNITED STATES PATENT OFFICE

1,942,218

MECHANISM FOR MANUFACTURING TENSIONLESS LOW-TWIST WIRE ROPES

Herrmann Schmitz, Cologne-Dellbruck, Germany, assignor, by mesne assignments, to American Cable Company, Inc., Bridgeport, Conn., a corporation of Delaware Application August 29, 1932, Serial No. 630,803, and in Germany December 23, 1931

4 Claims. (Cl. 117—20)

The production of stress-free ropes or cables is predicated upon the avoidance or preclusion of twisting of the rope elements in the course of the laying or stranding process, and on the use of means whereby the rope or cable elements are bent or stressed beyond the elastic limit a short distance ahead of the stranding point. In the mechanisms and arrangements used and suggested in the prior art for the purpose of preforming, i. e., for causing deflection out of the straight line or direction there are used, for instance, pins, pegs or bolts, a plurality of guiding disks disposed transversely to the stranding axis, said disks having openings for the guiding of the wires, or sets of rolls between which latter the rope constituents or elements are conveyed and guided.

With the exception of the arrangements comprising rolls, all of the ways and means known in the earlier art involve the drawback that, owing to the large frictional forces set up in the travel of the wires (or strands) the latter are subjected to more or less serious damage. The roll mechanisms working with a minimum amount of friction and the dimensions of which are governed by the size or gauge of the rope elements to be treated, are practically no longer serviceable below a certain thickness of the wire or strand.

According to the present invention an arrangement is employed in which, on the one hand, the friction is reduced to a minimum, and which, on the other hand, allows of insuring in a simple way an efficient and satisfactory preforming even where wires or strands of small gauge are dealt with. The essential feature of the invention consists in the use of balls made of metal or hard organic material which are supported in disks in a circle concentric to the stranding axis, which are capable of turning about themselves in all directions, and about which the wires or strands are bent as they are passed through two closely adjacent or neighboring balls, i. e., the gaps formed between them.

Figure 1:
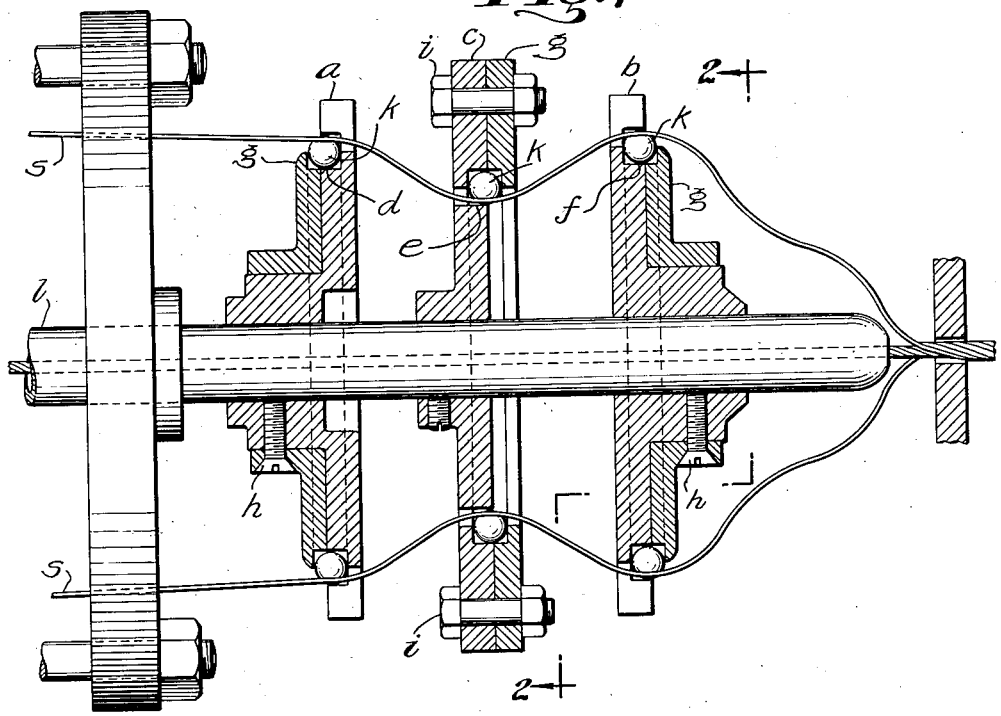
Fig. 1 is a longitudinal, vertical section of the device.
Figure 2:
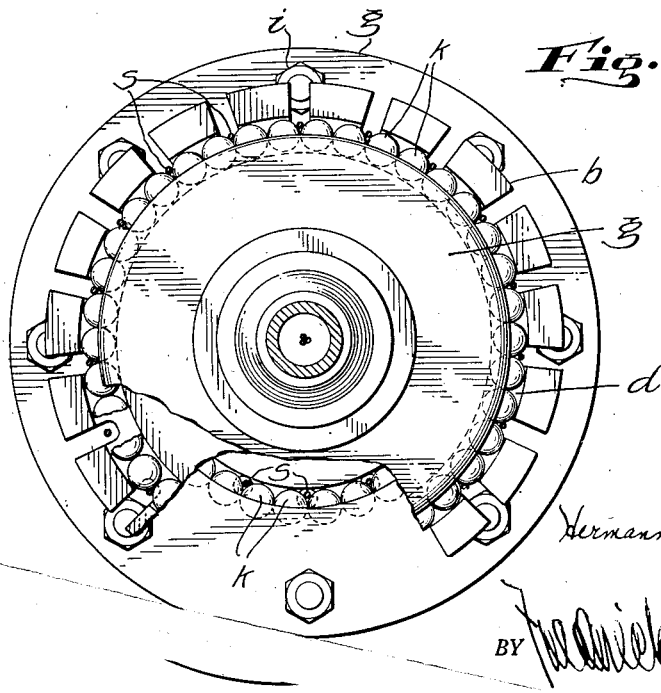
Fig. 2 is a view on the line 2—2 of Fig. 1.

One embodiment of such an arrangement consists, for instance, as shown in Fig. 1, of disks $a$, $b$, $c$, each of which has a circle or rim of balls $d$, $f$, $e$, respectively, said disks being shiftably supported one behind the other upon a hollow shaft 1, arranged on the stranding head. The rope or cable element, $s$, fed out from the storage winch or spool is passed through the gap or clearance between two contiguous balls $k$ of each ball-rim $(d, e, f)$ in a direction from the inside towards the outside, the rope element incidentally being bent by means of the smaller central ring. The balls are held in the suitably machined disks $a$, $b$, $c$, by the aid of cooperating plates $g$ and screws $h$ or bolts $i$. As shown in Fig. 1 the rims of balls arranged in the two outer disks $a$ and $b$ as indicated at $d$ and $f$ are of larger diameter than the rim of balls $e$ formed in the central disk $c$. However, the bending could be effected also inversely, that is to say, in such a manner that the ball-rims or circles of the outer disks are of smaller diameter than the central one. Fig. 2 is a top view of one of the outer disks $a$ partly in elevation and partly in section. For the sake of better understanding and greater clarity and also in order to preclude interference between the rope elements $s$, alternate gaps between balls $k$ have been skipped, as will be seen from the drawing. Instead of the arrangement of the ball rims as above described, it would similarly be feasible also to use a ball-rim of larger diameter and a smaller ball-rim disposed at any desired proximity to the stranding die for the purpose of preforming or pre-bending the rope elements. The size of the balls, generally speaking, is governed by the gauge of the rope or cable elements to be preformed, though one and the same size of ball could be utilized for wire and strand gauges differing from one another, within certain limits.

I claim:

1. Mechanism mounted ahead of the stranding point and serving for the pre-bending or pre-forming of the rope or cable elements in the manufacture of tensionless low-twist strands or ropes in stranding machines, with this characteristic feature that balls rotatable about their own axes and placed at close contiguity to one another, said balls being supported or rested inside a ball-rim partaking of the motion of the stranding or laying machine, serve for the pre-forming or pre-bending of the rope or cable elements which are guided through the inner and outer gap between adjacent pairs of balls.

2. Mechanism for the preforming of rope elements in the manufacture of tensionless low-twist strands or ropes, consisting of disks having guide or conveyor gaps and being mounted shiftably on a hollow shaft secured to the stranding head, characterized by a rim or circle of balls secured concentrically to the shaft upon each disk by means of cooperating plate, the inner and outer gaps of said ball-rim (formed between pairs of adjacent or contacting balls) constituting the guide holes for the rope elements to be bent.

3. Mechanism according to claim 2 consisting of three ball-rims, characterized by the feature that the middle ball-rim is smaller than the outer ones.

4. Mechanism according to claim 2, consisting of three ball-rims, with this characteristic feature that the outer ball-rims are smaller than the central ones.

HERRMANN SCHMITZ.